United States Patent
Foote et al.

(10) Patent No.: US 9,651,817 B1
(45) Date of Patent: May 16, 2017

(54) NANOPLASMONIC OPTICAL FILTER AND DISPLAY EMPLOYING SAME

(71) Applicants: Bobby D. Foote, Marion, IA (US); James E. Melzer, Encinitas, CA (US); Robert G. Brown, Tustin, CA (US)

(72) Inventors: Bobby D. Foote, Marion, IA (US); James E. Melzer, Encinitas, CA (US); Robert G. Brown, Tustin, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 84 days.

(21) Appl. No.: 14/449,861

(22) Filed: Aug. 1, 2014

(51) Int. Cl.
| | |
|---|---|
| *G02F 1/1335* | (2006.01) |
| *G02B 5/00* | (2006.01) |
| *G02B 5/26* | (2006.01) |
| *G02B 5/20* | (2006.01) |
| *G02B 1/00* | (2006.01) |
| *B82Y 20/00* | (2011.01) |

(52) U.S. Cl.
CPC ....... *G02F 1/133514* (2013.01); *G02B 1/002* (2013.01); *G02B 5/008* (2013.01); *G02B 5/204* (2013.01); *G02B 5/26* (2013.01); *B82Y 20/00* (2013.01); *Y10S 977/773* (2013.01); *Y10S 977/834* (2013.01)

(58) Field of Classification Search
None
See application file for complete search history.

(56) References Cited

U.S. PATENT DOCUMENTS

| | | | |
|---|---|---|---|
| 8,681,428 B1 | 3/2014 | Brown | |
| 2009/0034055 A1* | 2/2009 | Gibson | G02F 1/133516 359/296 |
| 2009/0310087 A1* | 12/2009 | Itoh | G02B 27/48 353/38 |
| 2012/0140305 A1* | 6/2012 | Yashiro | B82Y 20/00 359/230 |

* cited by examiner

*Primary Examiner* — Stephone B Allen
*Assistant Examiner* — James McGee
(74) *Attorney, Agent, or Firm* — Donna P. Suchy; Daniel M. Barbieri

(57) ABSTRACT

A nanoplasmonic optical reflective includes a particle layer including nano-particles in a substrate material. The nano-particles are arranged in one or more arrays to provide a nano plasmonic reflection of electromagnetic radiation at a selected wavelength. A color display includes a light source configured to emit light, and a nanoplasmonic filter section the nanoplasmonic optical filter. The color display further includes pixel addressing electronics configured to address pixels within the nanoplasmonic filter section, and display optics arranged to display a color image based on addressed pixels by the pixel addressing electronics and the nanoplasmonic reflection or transmission of the light in selected wavelength bands. The color display may be arranged in passive reflective, passive transmissive, active reflective, or active transmissive architectures.

12 Claims, 7 Drawing Sheets

NANOPLASMONIC OPTICAL FILTER AND DISPLAY EMPLOYING SAME

FIELD OF INVENTION

The present invention relates to nanoplasmonic optical filters, and to color displays employing nanoplasmonic optical filters.

BACKGROUND OF THE INVENTION

Color displays are known to be used for applications such as Helmet Mounted Displays (HMDs). Achieving a high brightness color display with needed contrast for an HMD during the day may be difficult. Bright green displays have been proven in many existing HMDs and can be achieved with technologies which include Active Matrix Liquid Crystal Display (AMLCD), Organic Light Emitting Diode (OLED) and Liquid Crystal on Silicon (LCOS) technologies. For example, AMLCD displays that are backlit with green LEDs are known. These green LEDs are extremely efficient and achieve the needed brightness with between 1 and 3 watts. Since the backlight is green, no color filters are required. The transmission for such displays, however, is 15%, and therefore the backlight needs to be above 17,000 ftL to achieve at least 2500 ftL at the face of the display. A full color AMLCD would require filters that would reduce the transmission to between 3 and 5%. This increases the backlight requirements for green to 50,000 ftL for full color.

LCOS displays are also known. LCOS displays are reflective and provide efficiency for color displays. With a reflective efficiency of 70% and fill factor of 90%, a bright green LCOS display for day is achievable. Full color displays for LCOS are achieved by full field sequential lighting of the display with red, green and blue high brightness LEDs or lasers. This provides a high resolution color display, but must be refreshed at a minimum of 180 Hz and synced with alternating three color lighting.

SUMMARY

According to one embodiment there is provided a nanoplasmonic optical filter, comprising: a particle layer including nano-particles in a substrate material, wherein the nano-particles are arranged in one or more arrays to provide a nano plasmonic reflection of electromagnetic radiation at a selected wavelength.

According to one aspect of the embodiment, the selected wavelength is in one of ultraviolet, visible, infrared, THz or radio-frequency regions.

According to another aspect of the embodiment, the particle layer comprises a plurality of sublayers, each sublayer including nano-particles arranged in an array in the substrate material.

According to another aspect of the embodiment, the nano-particles are formed of Al, Au or Ag.

According to another aspect of the embodiment, the substrate material is an insulative material.

According to another embodiment there is provided a color display comprising: a light source configured to emit light; a nanoplasmonic filter section comprising a nanoplasmonic optical filter arranged to receive light from the light source, the nanoplasmonic optical filter comprising a particle layer including nano-particles in a substrate material, wherein the nano-particles are arranged in one or more arrays to provide a nanoplasmonic reflection or transmission of the light in selected wavelength bands; pixel addressing electronics configured to address pixels within the nanoplasmonic filter section; and display optics arranged to display a color image based on addressed pixels by the pixel addressing electronics and the nanoplasmonic reflection or transmission of the light in selected wavelength bands.

According to one aspect of the embodiment, the light source is a white light source emitting white light.

According to another aspect of the embodiment, the display optics comprises display imaging optics arranged to image reflected light from the nanoplasmonic filter section to provide a color image.

According to another aspect of the embodiment, the display optics further comprises a beam splitter, the beam splitter arranged to direct light from the light source to the nanoplasmonic filter section, and direct reflected light received from the nanoplasmonic filter section to the display imaging optics.

According to another aspect of the embodiment, the nanoplasmonic filter section is arranged to selectively transmit light received from the light source to the display optics, the display optics arranged to image the light from the nanoplasmonic filter section to provide a color image.

According to another aspect of the embodiment, the light source is a configured to provide light at a plurality of narrow band visible wavelengths, and wherein the pixel addressing electronics is configured to selectively provide a voltage to pixels of the nanoplasmonic filter to change the change the reflectivity wavelengths of the pixels.

According to another aspect of the embodiment, the display optics comprises display imaging optics arranged to image reflected light from the nanoplasmonic filter section to provide a color image.

According to another aspect of the embodiment, the display optics further comprises a beam splitter, the beam splitter arranged to direct light from the light source to the nanoplasmonic filter section, and direct reflected light received from the nanoplasmonic filter section to the display imaging optics.

According to another aspect of the embodiment, the light source comprises: a plurality of narrow band light sources emitting light in different narrow band visible wavelengths.

According to another aspect of the embodiment, the plurality of narrow band light sources comprise a plurality of lasers, the light source further comprises: a despeckler arranged to receive and despeckle light from the plurality of light sources; and focusing optics arranged to focus light from the despeckler onto the beam splitter.

According to another aspect of the embodiment, the nanoplasmonic filter section is arranged to selectively transmit light received from the light source to the display optics, the display imaging optics arranged to image the light from the nanoplasmonic filter section to provide a color image.

According to another aspect of the embodiment, the light source comprises: a plurality of narrow band light sources emitting light in different narrow band visible wavelengths.

According to another aspect of the embodiment, the plurality of narrow band light sources comprise a plurality of lasers, the light source further comprises: a despeckler arranged to receive and despeckle light from the plurality of light sources; and focusing optics arranged to focus light from the despeckler onto the nanoplasmonic filter section.

According to another aspect of the embodiment, the particle layer comprises a plurality of sublayers, each sublayer including nano-particles arranged in an array in the substrate material.

According to another aspect of the embodiment, the nanoplasmonic filter section comprises a pixelated shutter addressed by the pixel addressing electronics.

DETAILED DESCRIPTION

Described is a nanoplasmonic optical filter and a color display employing such a nanoplasmonic optical filter. Nano-particles embedded in a substrate may exhibit a plasmonic effect where the nano-particles may support surface plasmons or localized plasmons. The reflection or transmission of light at certain wavelengths is based on the plasmonic effect, for example, as discussed in U.S. Pat. No. 8,681,428, to Brown, which is incorporated by reference in its entirety.

Color Displays

Color displays employing such a nanoplasmonic optical filter may have an architecture with passive reflective mode, passive transmissive mode, active reflective mode or active transmissive mode. In this context passive means that the nanoplasmonic optical reflective filter itself is not actively addressed, i.e., a voltage is not applied to the nanoplasmonic optical reflective filter itself. Further, in this context active means that the nanoplasmonic optical reflective filter itself is actively addressed, i.e., a voltage is applied to the nanoplasmonic optical reflective filter itself.

The nanoplasmonic optical filter comprises a particle layer including nano-particles in a substrate material, wherein the nano-particles are arranged in one or more arrays to provide a nanoplasmonic reflection of the light in selected wavelength bands.

Figure 1:
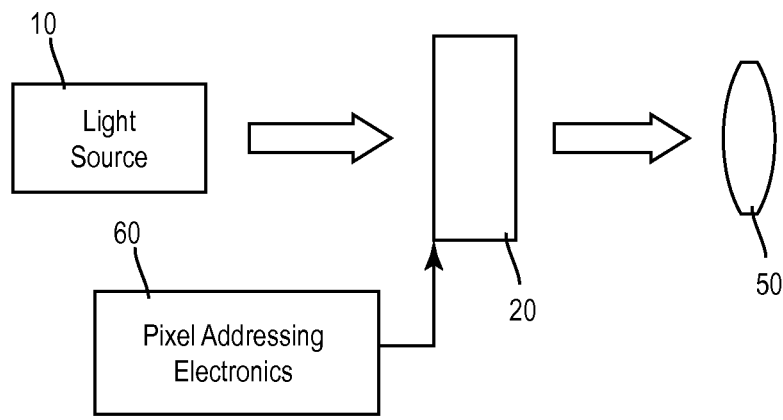
FIG. 1 is a schematic illustrating a color display according to an embodiment of the invention.

FIG. 1 is a schematic illustrating a color display according to an embodiment. The color display includes a light source 10, a nanoplasmonic filter section 20, pixel addressing electronics 60 and display optics 50.

The light source 10 is configured to emit light. The light source 10 may include one or more LEDs, or other types of light sources, such as lasers, for example. The light source 10 in this embodiment may emit white light. In this regard, if the light source includes LEDs emitting at different wavelengths, the LEDs may be chosen to provide an overall white light spectrum.

The nanoplasmonic filter section 20 includes a nanoplasmonic optical filter, and is arranged to received light from the light source 10.

The pixel addressing electronics 60 are configured to address pixels within the nanoplasmonic filter section 20, to thereby select a color for the pixel. The display optics 50 are arranged to display a color image based on addressed pixels by the pixel addressing electronics 60 and the nanoplasmonic reflection or transmission of the light in selected wavelength bands.

Figure 2:
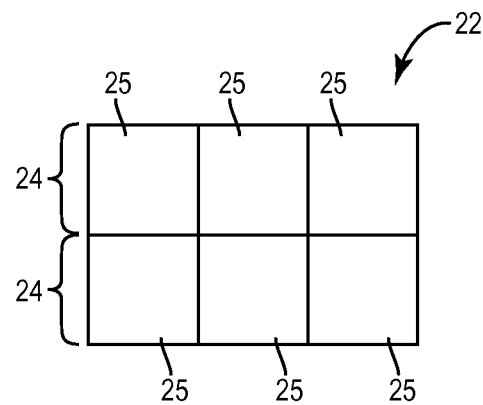
FIG. 2 is a schematic illustrating a portion of a nanoplasmonic optical filter according to an embodiment of the invention.

FIG. 2 is a schematic illustrating a portion of a nanoplasmonic optical filter 22 with two pixels 24, where each pixel has sub pixels 25. In general, each nanoplasmonic optical filter 22 will comprise a large number of pixels, where FIG. 2 only illustrates two pixels 24 for ease of illustration. For a display arranged in reflective mode, each sub pixel 25 of a pixel 24 will reflect light in a different selected wavelength band. For example, for a color display using red, green, and blue colors, one of the sub pixels 25 will reflect light in a wavelength band in the red, one of the sub pixels 25 will reflect light in a wavelength band in the green, and one of the sub pixels 25 will reflect light in a wavelength band in the blue. The present invention, however, is not limited to red, green and blue for the selected wavelength bands, and other wavelength bands may be employed.

Figure 3A:
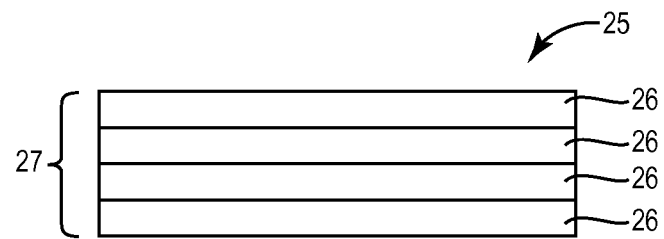
FIG. 3A is a schematic of a sub pixel of a nanoplasmonic optical filter according to an embodiment of the invention.
Figure 3B:
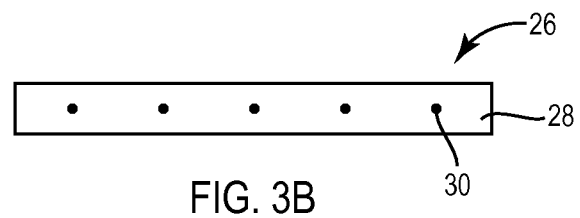
FIG. 3B is a schematic of a side view of a sublayer of the nanoplasmonic optical filter of FIG. 3A.

FIG. 3A is a side schematic view of a sub pixel 25 of a nanoplasmonic optical filter 22 according to one embodiment. The sub pixel 25 includes a particle layer 27 including one or more sublayers 26. Each sublayer 26, as shown in FIG. 3B, includes nano-particles 30 arranged in a substrate material 28. The nano-particles 30 may be arranged in one or more arrays to provide nano plasmonic reflection of light in a selected wavelength band.

Figure 3C:
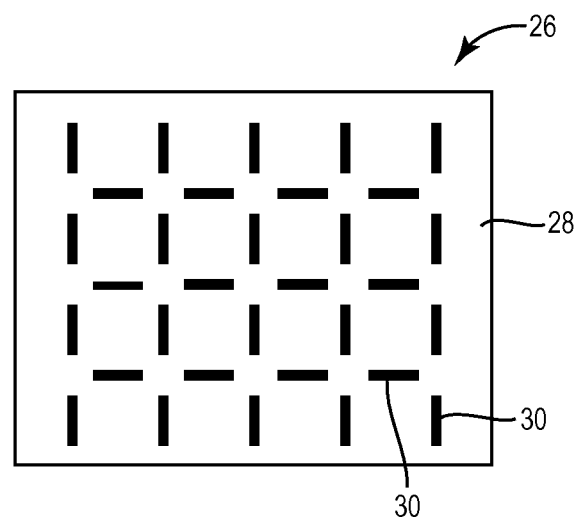
FIG. 3C is a schematic of a top view of the sublayer of FIG. 3B.

FIG. 3C is a top view of one sublayer 26 of FIG. 3B. As can be seen in FIG. 3C, the nano-particles 30 are embedded within the substrate material 28 so as to form an array of nano-particles 30. FIG. 3C illustrates the nano-particles 30 to be arranged in lines, and specifically in a checkerboard pattern with both vertical and horizontal lines of nano-particles 30. The arrangement of nano-particles 30 may be other than a checkboard pattern, and may be all oriented in a same direction, for example.

As can be surmised from FIGS. 3B and 3C, the nano-particles 30 may be cylinders. Alternatively, the nano-particles may have any shape as appropriate, and may be, for example, cylindrical, spherical, cubic, rectangular-cubic, ellipsoidal, planar or spiral-twisted.

The nano-particles 30 are formed of a material, and with a size, shape and spacing to provide reflection at a desired wavelength. The nano-particles 30 may be formed of Al, Au, or Ag, for example, or of some other material. Specific arrangements for reflecting a wavelength band in the blue, green or red region are described later.

Figure 4:
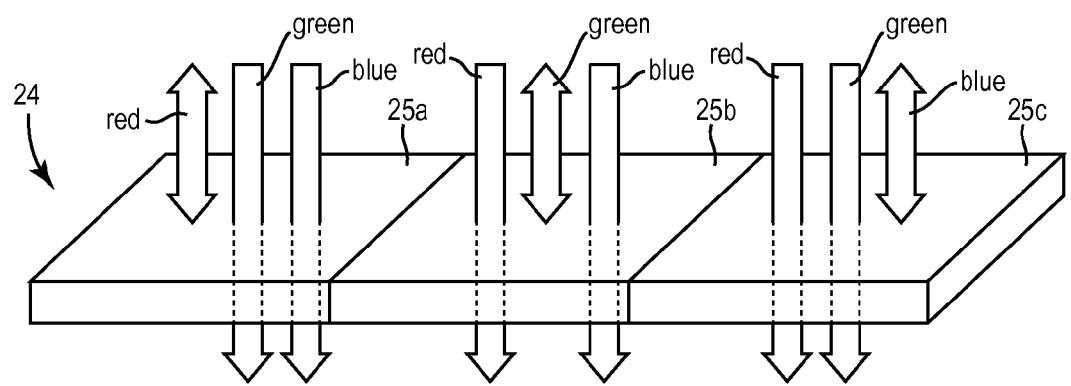
FIG. 4 illustrates a single pixel with subpixels of a nanoplasmonic optical filter arranged for a passive reflective mode according to an embodiment of the invention.

FIG. 4 illustrates a single pixel 24 of a nanoplasmonic optical filter with three sub pixels 25a, 25b and 25c, which respectively reflect light in a wavelength band in the red, green and blue region. Specifically, sub pixel 25a reflects red, but transmits green and blue, sub pixel 25b reflects green, but transmits red and blue, and sub pixel 25c reflects blue, but transmits red and green. Beneficially, each of the sub pixels 25a, 25b and 25c based on nanoplasmonic material will reflect back nearly 100% of a desired one of the primary colors. FIG. 4 illustrates the pixel 24 to have a rectangular shape, and the sub pixels 25a, 25b and 25c to have square shapes for ease of illustration. In general, the shapes of the pixel 24 and sub pixels 25a, 25b and 25c are not limited to rectangular and square shapes, respectively.

Passive Reflective Mode Color Display

Figure 5:
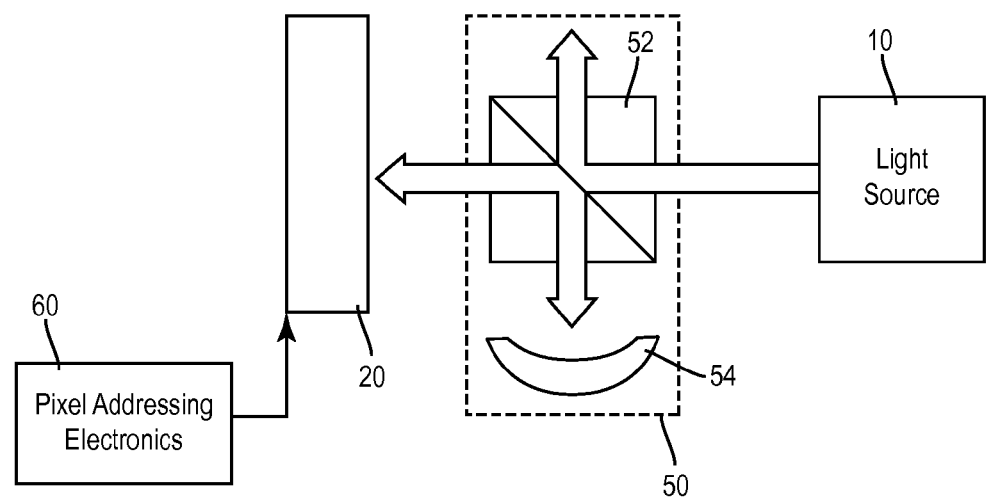
FIG. 5 is a schematic illustrating a color display where the nanoplasmonic filter is arranged to be in passive reflective mode according to an embodiment of the invention.

FIG. 5 is a schematic illustrating a color display arranged to be in passive reflective mode according to an embodiment. In this context passive means that the nanoplasmonic optical filter itself is not actively addressed, i.e., a voltage is not applied to the nanoplasmonic optical filter itself. The color display in the embodiment of FIG. 5 includes a light source 10, a nanoplasmonic filter section 20, pixel addressing electronics 60, and display optics 50 arranged as described in FIG. 1.

The arrangement in FIG. 5 has a reflective architecture. With this architecture, the display of FIG. 5 provides a non-field sequential full color display that does not require color filters in addition to the nanoplasmonic filters.

The display optics 50 in FIG. 5 includes a beam splitter 52 and display imaging optics 54. The beam splitter 52 may be a polarizing beam splitter, for example. The beam splitter 52 is arranged to direct light from the light source 10 to the nanoplasmonic filter section 20. The nanoplasmonic filter section 20 reflects back light in selected wavelength bands. This light which is reflected back is then directed by the beam splitter 52 section to the display imaging optics 54. The display imaging optics 54 is arranged to image the light from the beam splitter to provide a full color image.

Figure 6:
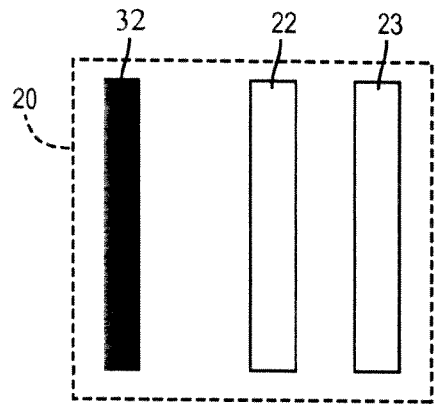
FIG. 6 is a schematic illustrating a nanoplasmonic filter section of the display of FIG. 5.

FIG. 6 is a schematic illustrating a nanoplasmonic filter section 20 according to the passive reflective architecture in FIG. 5. The nanoplasmonic filter section 20 includes a nanoplasmonic optical filter 22, a pixelated liquid crystal shutter 23, and light dump 32. Light which is not reflected by the nanoplasmonic optical filter 22 is absorbed by the light dump 32. The pixel addressing electronics 60 addresses pixels in the pixelated liquid crystal shutter 23 to allow light to pass through selected pixels of the shutter 23. The pixelated liquid crystal shutter 23 may be in the form of an AMLCD, for example.

The passive reflective color display of FIG. 5 has the benefit of not being sequential but still yielding nearly 18% of the original light source assuming 99% nanoplasmonic reflection, 70% transmission of the pixelated liquid crystal shutter 23, 90% fill factor and a 50% beamsplitter.

Passive Transmissive Mode Color Display

Figure 8:
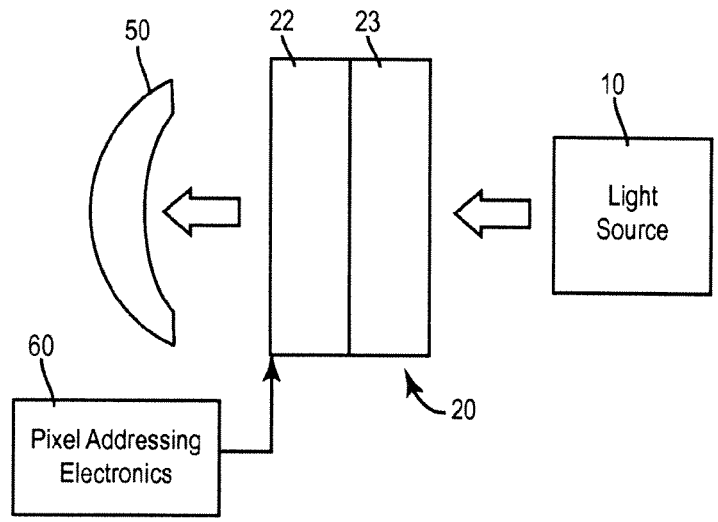
FIG. 8 is a schematic illustrating a color where the nanoplasmonic filter is arranged to be in passive transmission mode according to an embodiment of the invention.

FIG. 8 is a schematic illustrating a color display arranged to be in passive transmission mode according to an embodiment. In this context passive means that the nanoplasmonic optical filter itself is not actively addressed, i.e., a voltage is not applied to the nanoplasmonic optical reflective filter itself. The color display in the embodiment of FIG. 8 includes a light source 10, a nanoplasmonic filter section 20, pixel addressing electronics 60 and display optics 50 arranged as described in FIG. 1.

The nanoplasmonic filter section 20 in the color display is arranged to selectively transmit light received from the light source 10 to the display optics 50. In turn, the display optics 50 are arranged to image the light from the nanoplasmonic filter section 20 to provide a full color image.

The passive transmission mode color display of the embodiment of FIG. 8 may have a nanoplasmonic filter section 20 according to an AMLCD architecture, or some other architecture. In FIG. 8, the nanoplasmonic filter section 20 may have, in addition to a nanoplasmonic optical filter 22, an AMLCD architecture with a pixelated liquid crystal shutter 23 used in transmissive mode, such as a twisted nematic type, where the shutter is addressed by the pixel addressing electronics 60.

Figure 7:
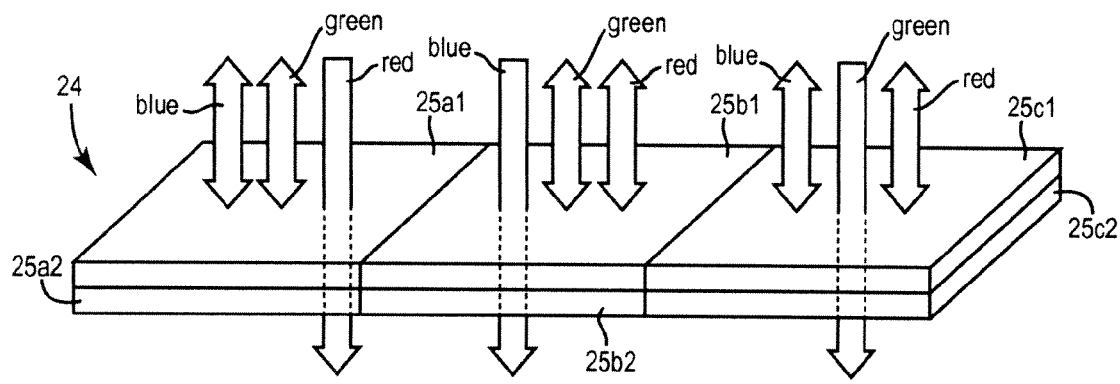
FIG. 7 is a schematic illustrating a pixel for the display of FIG. 8.

FIG. 7 illustrates a pixel 24 for the passive transmissive color display of FIG. 8. The pixel 24 includes sub pixels 25a, 25b, and 25c. Each of the sub pixels has two vertically aligned sub pixel regions. Sub pixel 25a has sub pixel regions 25a1 and 25a2. Sub pixel 25b has sub pixel regions 25b1 and 25b2. Sub pixel 25c has sub pixel regions 25c1 and 25c2.

Each of the sub pixels 25a, 25b and 25c respectively transmit light in a wavelength band in the red, green and blue region. Specifically, sub pixel 25a transmits red, sub pixel 25b transmits green, and sub pixel 25c transmits blue. In that regard, sub pixel regions 25a1 and 25a2 respectively reflect blue and green, but transmit red, sub pixel regions 25b1 and 25b2 respectively reflect red and green, but transmit blue, and sub pixel regions 25c1 and 25c2 respectively reflect red and blue, but transmit green.

The passive transmissive configuration of the display of FIG. 8 could potentially increase the efficiency of the system by a factor of four over the passive reflective configuration of FIG. 5.

Active Reflective Mode Color Display

Figure 12:
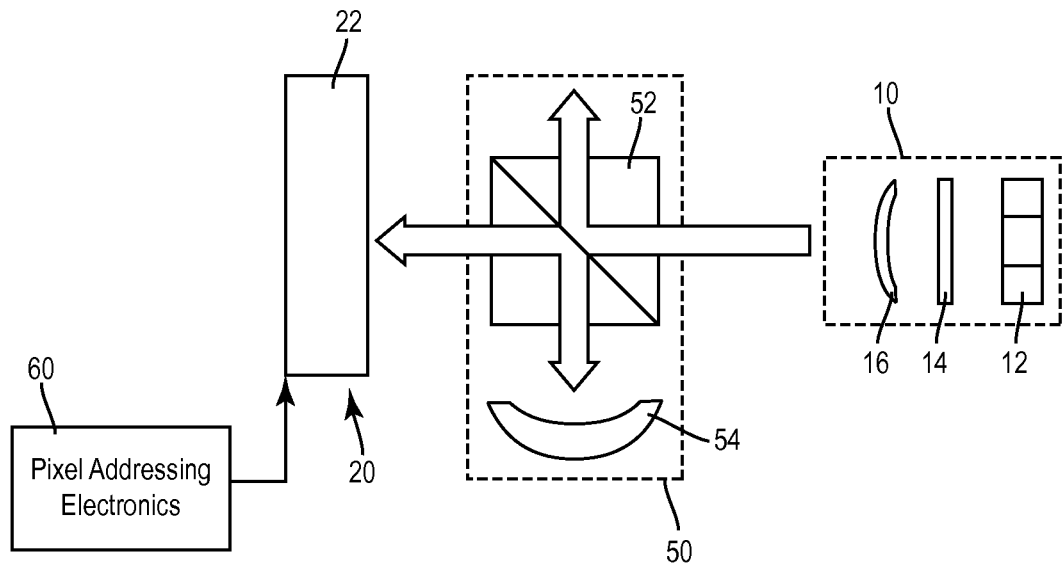
FIG. 12 is a schematic illustrating a color display arranged to be in active reflective mode according to an embodiment of the invention.

FIG. 12 is a schematic illustrating a color display arranged to be in active reflective mode according to an embodiment. In this context active means that the nanoplasmonic optical filter itself is actively addressed, i.e., a voltage is applied to the nanoplasmonic optical filter itself. As an advantage over the passive reflective and passive transmissive architectures, this active architecture does not need a separate structure, such as a pixelated shutter, to address the pixels desired. Rather, because the nanoplasmonic optical filter itself is actively addressed, the need for additional components, such as a pixelated shutter, are not needed, resulting in improved light efficiency.

The color display in the embodiment of FIG. 12 includes a light source 10, a nanoplasmonic filter section 20, pixel addressing electronics 60 and display optics 50 arranged as described in FIG. 1. The pixel addressing electronics 60 actively provides a voltage to selected pixels in the nanoplasmonic optical reflective filter 22 of the nanoplasmonic filter section 20.

Figure 9:
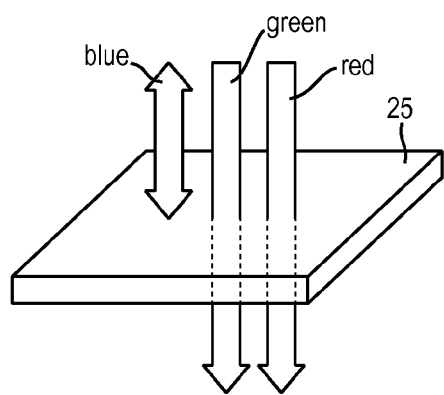
FIG. 9 is a schematic illustrating an example of a sub pixel for the active reflective nanoplasmonic filter section of the display of FIG. 12.

FIG. 9 illustrates a sub pixel 25 for the nanoplasmonic filter of FIG. 12. The selected band of wavelengths that the sub pixel 25 reflects can be shifted by applying a voltage.

This allows the design of a pixel that can be switched on or off. For a sub pixel 25 that reflects in a selected wavelength band in the blue, as in FIG. 9, when no voltage is applied, a voltage may be applied to the sub pixel to shift reflectivity such that the pixel transmits in the selected wavelength band. Thus, the sub pixel may be turned on and off by applying a voltage.

Figure 10:
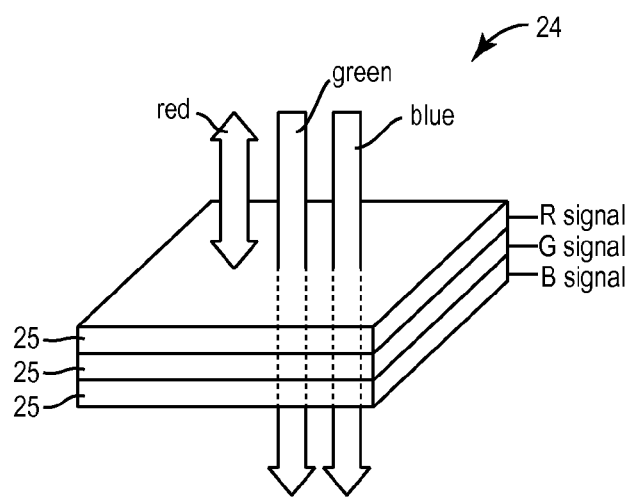
FIG. 10 is a schematic illustrating a pixel arrangement for the display of FIG. 12.

FIG. 10 illustrates a pixel arrangement of a reflective configuration with a pixel 24 with vertically arranged sub pixels 25, where each sub pixel reflects light in a different selected wavelength band when that sub pixel is on. For example, FIG. 10 illustrates the case where the top sub pixel reflects in the red, the middle sub pixel reflects in the green, and the bottom sub pixel reflects in the blue, when an appropriate voltage is applied to the sub pixels. In order to reflect in the red, a voltage is applied to the top red sub pixel via the R signal. To reflect in the green, a voltage is applied to the middle green sub pixel via the G signal. To reflect in the blue, a voltage is applied to the bottom blue sub pixel via the B signal. Each of the sub pixels 25 is individually addressable. Further, more than one of the sub pixels 25 of a given pixel may be addressed at once to provide colors other than blue, red, and green.

Returning to FIG. 12, the pixel addressing electronics 60 addresses the sub pixels by applying the R, G and B signals.

The display optics in FIG. 12 includes a beam splitter 52 and display imaging optics 54. The beam splitter 52 may be a polarizing beam splitter, for example. The beam splitter 52 is arranged to direct light from the light source 10 to the nanoplasmonic filter section 20. The nanoplasmonic filter section 20 reflects back light in selected wavelength bands. This light which is reflected back is then directed by the beam splitter 52 to the display imaging optics 54. The display imaging optics 54 is arranged to image the light from the beam splitter 52 to provide a full color image.

The light source 10 may include a plurality of narrow band light sources 12 emitting light in different narrow band visible wavelengths. The plurality of narrow band light sources 12 may be a plurality of lasers, for example. The light source 10 may further include a despeckler 14 arranged to receive and despeckle light from the plurality of light sources 12, particularly in the case of a coherent light source such as a laser or lasers as the light source 10. The light source 10 may still further include focusing optics 16 arranged to focus light from the despeckler 14 onto the beam splitter 52.

Active Transmissive Mode Color Display

Figure 13:
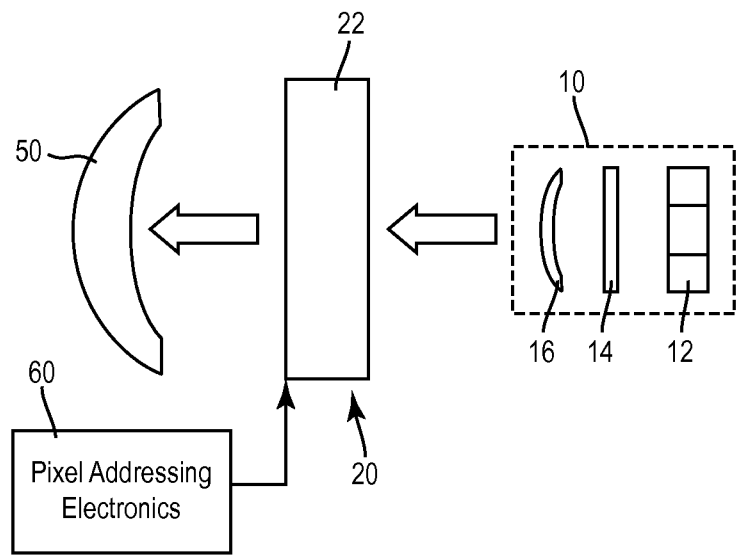
FIG. 13 is a schematic illustrating a color display arranged to be in active transmission mode according to an embodiment of the invention.

FIG. 13 is a schematic illustrating a color display arranged to be in active transmission mode according to an embodiment. In this context active means that the nanoplasmonic optical filter itself is actively addressed, i.e., a voltage is applied to the nanoplasmonic optical filter itself. As an advantage over the passive reflective and passive transmissive architectures, this active architecture does not need a separate structure, such as a pixelated shutter, to address the pixels desired. Rather, because the nanoplasmonic optical filter itself is actively addressed, the need for additional components, such as a pixelated shutter, are not needed, resulting in improved light efficiency.

The color display in the embodiment of FIG. 13 includes a light source 10, a nanoplasmonic filter section 20, pixel addressing electronics 60 and display optics 50 arranged as described in FIG. 1. The pixel addressing electronics 60 actively provides a voltage to selected pixels in the nanoplasmonic optical filter 22 of the nanoplasmonic filter section 20.

Figure 11:
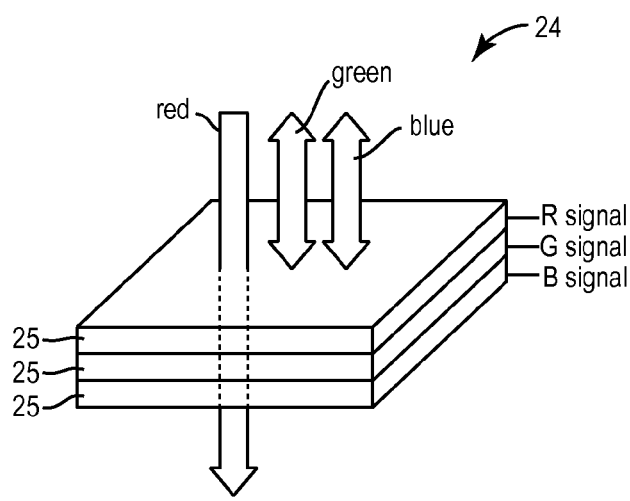
FIG. 11 is a schematic illustrating a pixel arrangement for the display of FIG. 13.

FIG. 11 illustrates a pixel arrangement of a reflective configuration with a pixel 24 with vertically arranged sub pixels 25, where the pixel transmits light only in a selected wavelength band when an appropriate one of the sub pixels is on. According to the arrangement in FIG. 11 when a voltage is applied only to the top red sub pixel via the R signal, the top red sub pixel transmits in the red, while the middle green subpixel and the bottom blue sub pixel reflect green and blue, respectively. When a voltage is applied only to the middle green sub pixel via the G signal, the middle green sub pixel transmits in the green, while the other sub pixels respectively reflect red and blue. When a voltage is applied only to the bottom blue sub pixel via the B signal, the bottom blue sub pixel transmits in the blue, while the other sub pixels respectively reflect red and green. Each of the sub pixels 25 is individually addressable. Further, more than one of the sub pixels 25 of a given pixel 24 may be addressed via the pixel addressing electronics 60 at once to provide colors other than blue, red, and green.

It should be noted that the arrangement in FIG. 11 differs from that in FIG. 10 in that in the FIG. 10 arrangement, when a voltage is applied to a sub pixel corresponding to a particular color, that sub pixel reflects that particular color, while in the FIG. 11 arrangement, when a voltage is applied to a sub pixel corresponding to a particular color, that sub pixel transmits that particular color.

Returning to FIG. 13, the pixel addressing electronics 60 addresses the sub pixels by applying R, G and B signals.

In FIG. 13, the nanoplasmonic filter section 20 in the color display is arranged to selectively transmit light received from the light source 10 to the display optics 50. In turn, the display optics 50 is arranged to image the light from the nanoplasmonic filter section 20 to provide a color image.

The light source 10 may include a plurality of narrow band light sources 12 emitting light in different narrow band visible wavelengths. The plurality of narrow band light sources 12 may be a plurality of lasers, for example. The light source 10 may further include a despeckler 14 arranged to receive and despeckle light from the plurality of light sources 12, particularly in the case of a coherent light source such as a laser or lasers as the light source 10. The light source 10 may still further include focusing optics 16 arranged to focus light from the despeckler 14 onto the beam splitter 52.

The color displays including a nanoplasmonic optical filter as described provide a number of benefits. No color filters in addition to the nanoplasmonic optical filter results in brighter truer colors for the active architecture, because the nanoplasmonic optical filter, when switched by applying a voltage, as a pixel switching mechanism to create the image. Nanoplasmonic color filters can increase the efficiency of AMLCD color displays. Nanoplamonic sub pixels can be stacked to allow a single pixel to provide multiple colors. Active nanoplasmonic displays provide a large improvement in brightness, contrast, and switching speed.

White Light Source

As noted above, the light source 10 for the display may be a white light source depending on the application. One example of a white light source comprising visible LEDs with a balanced set of red, green and blue LEDs for display purposes is provide in [Chhajed, S. & Schubert, E. F., et al, 'Influence of junction temperature on chromaticity and color-rendering properties of trichromatic white-light sources based on light-emitting diodes', J. Appl. Phys., 97, 054506 (2005)]. The trichromatic emission spectrum of the white light source made out of the three types of LED is created from emissions at 455 nm, 525 nm and 605 nm in this example.

Nanoplasmonic Optical Filters

As discussed above, the nanoplasmonic optical filter may comprise a plurality of nano-particles arranged in one or more arrays to provide a nano plasmonic reflection or transmission of electromagnetic radiation at a selected wavelength. The nano-particles 30 are formed of a material, and with a size, shape and spacing to provide reflection at a desired wavelength.

Figure 14:
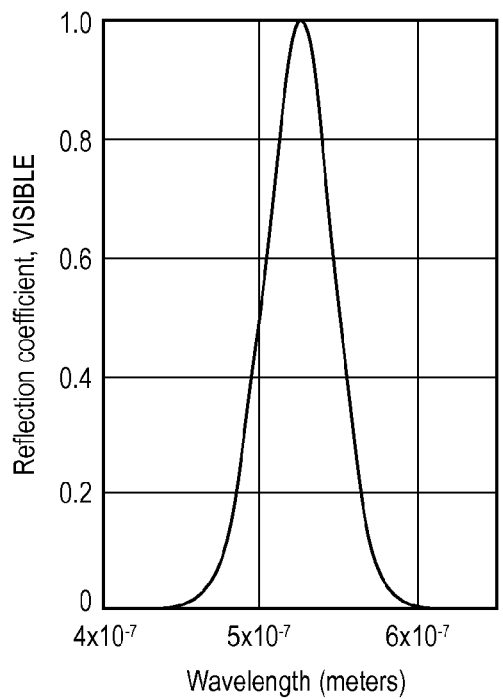
FIG. 14 is a graph illustrating a calculated reflection coefficient as a function of light wavelength with a peak reflection at 525 nm for a nanoplasmonic optical filter according to an embodiment of the invention.
Figure 15:
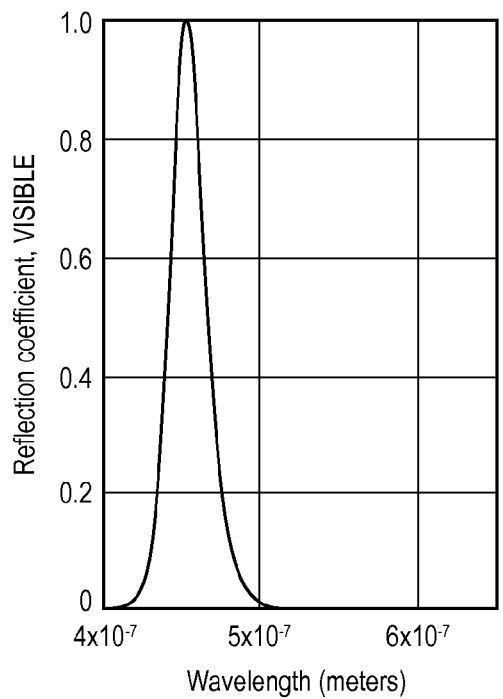
FIG. 15 is a graph illustrating a calculated reflection coefficient as a function of light wavelength with a peak reflection at 455 nm for a nanoplasmonic optical filter according to an embodiment of the invention.
Figure 16:
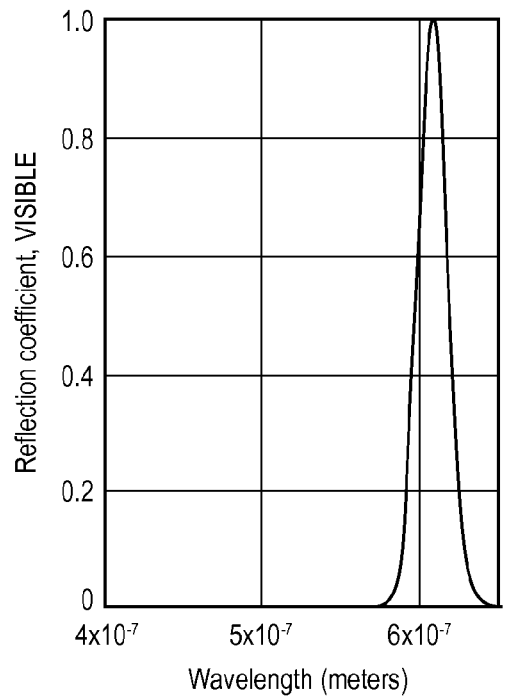
FIG. 16 is a graph illustrating a calculated reflection coefficient as a function of light wavelength with a peak reflection at 605 nm for a nanoplasmonic optical filter according to an embodiment of the invention.

For reflection in a wavelength band in the red, blue or green, aluminum nano-particles are appropriate. FIGS. 14, 15 and 16 are graphs illustrating a calculation of the reflection coefficient as a function of light wavelength for multiple sublayer nanoplasmonic optical filters tuned to have a high reflection in green, blue, and red, respectively. Specifically, the nanoplasmonic optical filters are tuned to have a high reflection at the wavelengths of 455 nm, 525 nm and 605 nm corresponding to the emissions of the white source described above. For the calculation of FIGS. 14, 15 and 16, the nanoplasmonic optical filter design includes aluminum nano-bars having 10 nm square cross-section as nano-particle arranged in a square lattice array as in FIG. 3C, and embedded in a visible transparent polymer or glass of refractive index ~2.0.

The reflection (reflectance) and transmission (transmittance) may be calculated, for example, as discussed in U.S. Pat. No. 8,681,428, to Brown, which is incorporated by reference in its entirety. The transmittance, T, reflectance, R, and refractive index, RI, may be determined from the following equations:

$$T = \left[1 + 16\pi^2 \frac{\text{Im}\{\alpha_{eff}\}}{lc^2 \cdot \lambda \cdot (N_S + N_M)} + 64 \cdot \frac{\pi^4}{[lc^2 \cdot \lambda \cdot (N_S + N_M)]^2} \cdot |\alpha_{eff}|^2\right]^{-1} \quad (1)$$

$$R = \frac{64 \cdot \pi^4}{[lc^2 \cdot \lambda \cdot (N_S + N_M)]^2} \cdot |\alpha_{eff}|^2 \cdot T \quad (2)$$

$$RI = \frac{1 + (R)^{0.5}}{1 - (R)^{0.5}} \quad (3)$$

where lc is the lattice dimension, $\lambda$=light wavelength, $\alpha_{eff}$=effective polarizability, $N_S$=refractive index of substrate, and $N_M$=refractive index of medium surrounding the nano-particles.

For the calculated reflection in FIG. 14, the bar-length is 12.7 nm, and the lattice-spacing is 100 nm. Further, for the reflection in FIG. 14, the number of sublayers is 5. In general, increasing the number of sublayers decreases the reflection linewidth of the reflection curve. The reflection coefficient in FIG. 14 has a maxima at 525 nm.

For the calculated reflection in FIG. 15, the bar-length is 9.8 nm, and the lattice-spacing is ~100 nm. Further, for the reflection in FIG. 15, the number of sublayers is 5 in a similar fashion to that for the arrangement resulting in the reflection of FIG. 14. The reflection coefficient in FIG. 15 has a maxima at 455 nm.

For the calculated reflection in FIG. 16, the bar-length is 16.3 nm, and the lattice-spacing is ~100 nm. Further, for the reflection in FIG. 16, the number of sublayers is 8. The reflection coefficient in FIG. 16 has a maxima at 605 nm.

The nanoplasmonic optical filters may be embedded in an electro-optic (EO) polymer for the purposes of electrically modulating the ON-OFF existence of the plasmonic effect. EO polymers can exhibit refractive index changes of a few percent, which is more than enough to create/destroy plasmon existence conditions. An electric field applied across the plasmonic filters could switch them on or off as needed, and in times less than micro seconds, which corresponds to the polymer limiting time.

The embodiments of the invention have been described in detail with particular reference to preferred embodiments thereof, but it will be understood by those skilled in the art that variations and modifications can be effected within the spirit and scope of the invention.

What is claimed is:

1. A color display comprising:
   a light source configured to emit light;
   a nanoplasmonic filter section comprising a nanoplasmonic optical filter arranged to receive light from the light source, the nanoplasmonic optical filter comprising a particle layer including nano-particles in a substrate material, wherein the nano-particles are arranged in one or more arrays to provide a nanoplasmonic reflection or transmission of the light in selected wavelength bands, the nanoplasmonic filter section comprising pixels, each of the pixels comprising a red subpixel, a blue subpixel, and a green subpixel arranged with respect to each other in a horizontal plane, each of the subpixels comprising some of the nano-particles, nanoplasmonic material of the red subpixel reflecting red light and transmitting blue and green light, nanoplasmonic material of the green subpixel reflecting green light and transmitting blue and red light, and nanoplasmonic material of the blue subpixel reflecting blue light and transmitting red and green light;
   pixel addressing electronics configured to address the pixels within the nanoplasmonic filter section; and
   display optics arranged to display a color image based on addressed pixels by the pixel addressing electronics and the nanoplasmonic reflection or transmission of the light in selected wavelength bands.

2. The color display of claim 1, wherein the nanoplasmonic filter section comprises a pixelated shutter addressed by the pixel addressing electronics.

3. The color display of claim 1, wherein the particle layer comprises a plurality of sublayers, each sublayer including nano-particles arranged in an array in the substrate material.

4. The color display of claim 1, wherein
   the light source is a white light source emitting white light.

5. The color display of claim 4, wherein,
   the display optics comprises display imaging optics arranged to image reflected light from the nanoplasmonic filter section to provide a color image.

6. The color display of claim 5, wherein,
   the display optics further comprises a beam splitter,
   the beam splitter arranged to direct light from the light source to the nanoplasmonic filter section, and direct reflected light received from the nanoplasmonic filter section to the display imaging optics.

7. The color display of claim 1, wherein,
   the light source is configured to provide light at a plurality of narrow band visible wavelengths, and wherein
   the pixel addressing electronics is configured to selectively provide a voltage to pixels of the nanoplasmonic filter to change wavelengths of reflectivity of the pixels.

8. The color display of claim 7, wherein
the display optics comprises display imaging optics arranged to image reflected light from the nanoplasmonic filter section to provide a color image.

9. The color display of claim 8, wherein
the display optics further comprises a beam splitter,
the beam splitter arranged to direct light from the light source to the nanoplasmonic filter section, and direct reflected light received from the nanoplasmonic filter section to the display imaging optics.

10. The color display of claim 8, wherein the light source comprises:
a plurality of narrow band light sources emitting light in different narrow band visible wavelengths.

11. The color display of claim 10, where the plurality of narrow band light sources comprise a plurality of lasers, the light source further comprising:
a despeckler arranged to receive and despeckle light from the plurality of light sources; and
focusing optics arranged to focus light from the despeckler onto the nanoplasmonic filter section.

12. The color display of claim 10, where the plurality of narrow band light sources comprise a plurality of lasers, the light source further comprising:
a despeckler arranged to receive and despeckle light from the plurality of light sources; and
focusing optics arranged to focus light from the despeckler onto a beam splitter.

* * * * *